United States Patent
Nolan et al.

(10) Patent No.: US 10,798,053 B2
(45) Date of Patent: Oct. 6, 2020

(54) ALIAS-BASED TIME-LIMITED LEASE ADDRESSING FOR INTERNET OF THINGS DEVICES

(71) Applicant: INTEL CORPORATION, Santa Clara, CA (US)

(72) Inventors: Keith Nolan, Mullingar (IE); Mark Kelly, Leixlip (IE); John Brady, Celbridge (IE); Charlie Sheridan, Ballivor (IE)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 15/859,428

(22) Filed: Dec. 30, 2017

(65) Prior Publication Data
US 2019/0036873 A1    Jan. 31, 2019

(51) Int. Cl.
*G06F 15/16*    (2006.01)
*H04L 29/12*    (2006.01)

(52) U.S. Cl.
CPC .......... *H04L 61/20* (2013.01); *H04L 61/106* (2013.01); *H04L 61/1552* (2013.01); *H04L 61/2053* (2013.01); *H04L 61/30* (2013.01); *H04L 61/6022* (2013.01); *H04L 61/6072* (2013.01); *H04L 61/103* (2013.01)

(58) Field of Classification Search
CPC .......... H04L 63/0272; H04L 61/2007; H04L 61/1511; H04L 45/24; H04L 61/35; H04L 63/0876; H04L 63/1458; H04L 63/0421; H04L 63/0428; G06F 21/606; G06F 16/951; G06F 15/8023
See application file for complete search history.

(56) References Cited

U.S. PATENT DOCUMENTS

| | | | | |
|---|---|---|---|---|
| 2004/0249974 | A1* | 12/2004 | Alkhatib | H04L 29/12349 709/245 |
| 2005/0204011 | A1* | 9/2005 | Velayudham | H04L 29/1215 709/206 |
| 2006/0140200 | A1* | 6/2006 | Black | H04L 29/06027 370/401 |
| 2012/0096163 | A1* | 4/2012 | Tai | H04L 41/0856 709/226 |
| 2014/0301295 | A1* | 10/2014 | Abraham | H04W 74/0808 370/329 |
| 2015/0039861 | A1* | 2/2015 | Rong | G06F 9/3017 712/216 |
| 2015/0134804 | A1* | 5/2015 | Yagiu | H04L 61/2046 709/223 |

(Continued)

OTHER PUBLICATIONS

Ganegedara et al., "Optimizing packet lookup in time and space on FPGA," 22nd International Conference on Field Programmable Logic and Applications (FPL), Oslo, Norway 2012, pp. 270-276.

*Primary Examiner* — Michael A Keller
*Assistant Examiner* — Thao D Duong
(74) *Attorney, Agent, or Firm* — Schwegman Lundberg & Woessner, P.A.

(57) ABSTRACT

An apparatus for addressing a plurality of Internet of Things (IoT) devices includes storage to store instructions and a processor. The processor is to execute the stored instructions to initialize an IoT device alias addressing space, to assign an alias address to each of a plurality of the IoT devices, where the alias addresses are time-limited, and to handle packet transactions using the assigned alias addresses.

31 Claims, 13 Drawing Sheets

(56) References Cited

U.S. PATENT DOCUMENTS

| | | | |
|---|---|---|---|
| 2016/0366106 A1* | 12/2016 | Smith | H04L 63/0428 |
| 2017/0041388 A1* | 2/2017 | Tal | H04W 12/08 |
| 2018/0096683 A1* | 4/2018 | James | G10L 15/183 |
| 2018/0103430 A1* | 4/2018 | He | H04W 48/16 |

\* cited by examiner

100

400

| Rank | Original Address |
|---|---|
| 1 | 2002:1111:1111:1111:96de:80ff:fea2:30fa |
| 2 | 2001:4562:c0fe:de67:96de:80ff:adb7:17a2 |
| ... | .... |
| N | 94:de:80:a2:30:fa |

| Alias Address / Shortcode |
|---|
| 0x1 |
| 0x2 |
| .... |
| 0xNNNN--N |

ALIAS-BASED TIME-LIMITED LEASE ADDRESSING FOR INTERNET OF THINGS DEVICES

TECHNICAL FIELD

The present techniques relate generally to Internet of Things (IoT) devices, including, for example, IoT devices that can perform remote sensing and actuation functions. More specifically, the present techniques relate to alias-based time-limited lease addressing for IoT devices.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

BRIEF DESCRIPTION OF THE DRAWINGS

FIG. 8 illustrates a mapping of original addresses to alias addresses (or shortcodes) in accordance with some embodiments.

FIG. 10, which includes

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
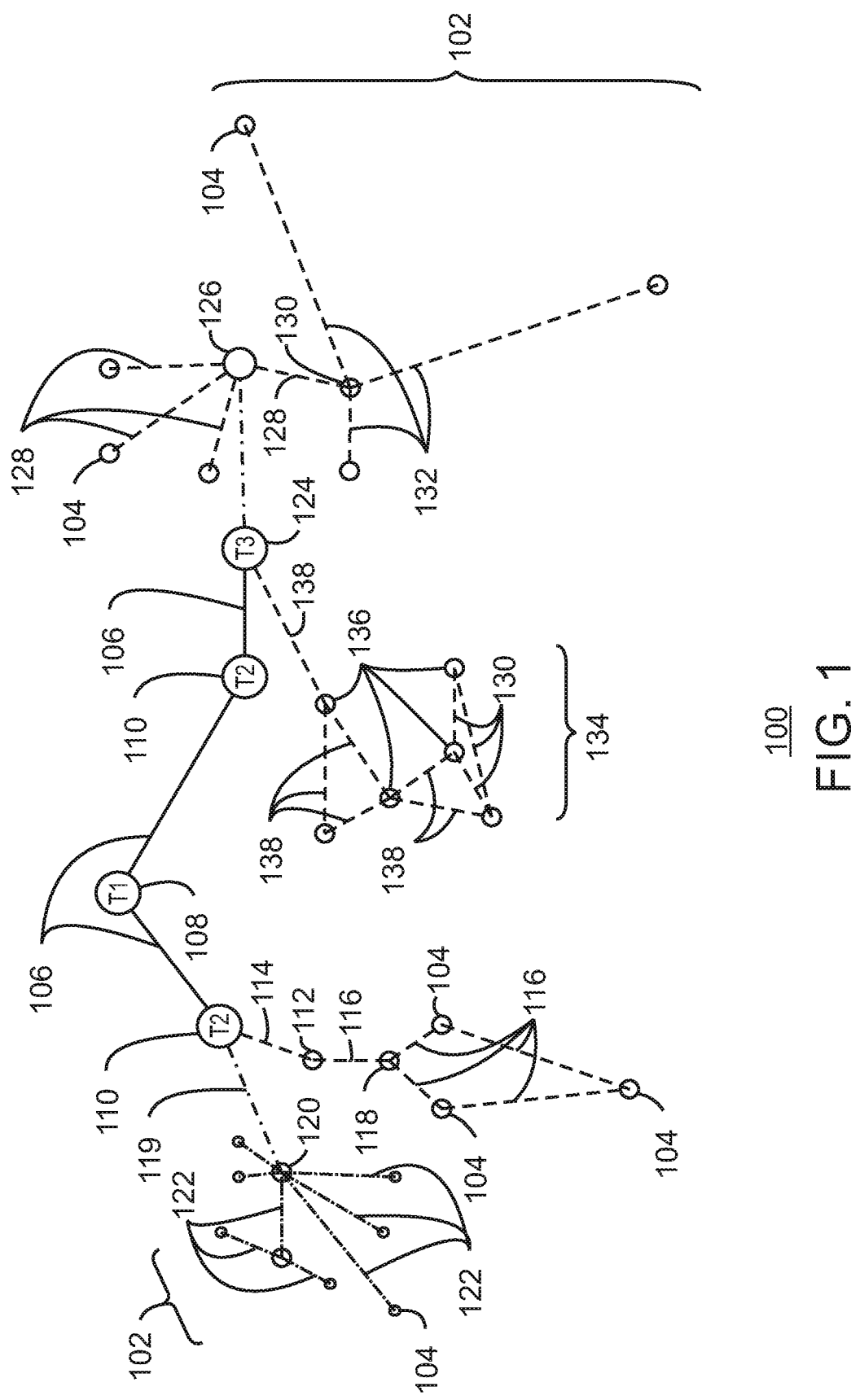
FIG. 1 illustrates interconnections that may be present in the Internet in accordance with some embodiments.

In some embodiments, address translation and lookups in heterogeneous networks are implemented. For example, in some embodiments, address translation and lookups in IoT networks such as fog networks or edge networks are implemented.

In many IoT networks, IoT devices can be transient. Therefore, when using fog and edge networks with a growing database of IoT device addresses, the time necessary to do lookups and to make fast connections can increase as the number of IoT devices increases. This increase in time is particularly troublesome for fog networks with mission critical use cases and industrial requirements, for example.

In some embodiments, an average time for repetitive transactions in terms of device addressing, connection establishment, or address look-up transactions can be reduced. In some embodiments, a reusable shortcode/alias implementation can be used. The implementation can be temporary in nature using non-persistent reusable shortcodes (or aliases). Node identifier addresses can be mapped to an alias table (or shortcode table) according to some embodiments. By using shortcodes/aliases to address IoT devices rather than very lengthy device IDs, packet size can be reduced significantly, which can result in a very large time saving when large lookups are being implemented.

Many different embodiments offer a wide variety of flexibility in how the aliases/shortcodes can be assigned. For example, in some embodiments, alias/shortcodes can be assigned based on one or more of ranking, behavior ranking, assigning by vendor, type of device, devices with prioritized data, which nodes will need to interact, proximity of devices, adjacency in a device table, segregation based on number ranges, etc., among others. In some embodiments, the nature of the network can be inferred based on the nodes themselves. In some embodiments, for example, the alias/shortcode can be assigned and ranked depending on behavior of the particular IoT device (for example, ranking based on the most active device, or ranking based on well behaved devices, etc.) In some embodiments, the shortest or fastest alias/shortcode can be assigned to devices that are connecting and disconnecting most rapidly, for example, which can reduce the association/disassociation time for those devices.

In some embodiments, the shortcode (alias) is reusable and has a time duration so that addressing databases can be restructured as devices come and go without causing undue pressure on processing resources or databases to become too large. According to some embodiments, a recyclable approach to device addressing may be used, resulting in the length of an ID for a particular IoT device, for example, to be much shorter.

FIGS. 1-4 include example operating environments such as Internet of Things (IoT) environments which may utilize principles described herein. The example operating environments of FIGS. 1-4 may utilize principles described herein of alias-based time-limited lease addressing (for example, for fog networks, edge networks, foglets, etc.) as illustrated in FIGS. 5-12 and described in reference thereto.

The Internet-of-Things (IoT) is a system in which a large number of computing devices are interconnected to each other and to a communications network (e.g., the Internet) to provide a functionality, such as data acquisition and actuation, at very low levels in networks. Low levels indicate devices that may be located at or near the edges of networks, such as the last devices before the networks end. As used herein, an IoT device may include a device performing a function, such as sensing or control, among others, in communication with other IoT devices and a communications network. The IoT device may include an autonomous device or a semiautonomous device configured to perform one or more functions. Often, IoT devices can be limited in memory, size, or functionality, allowing larger numbers to be deployed for a similar cost to a smaller number of larger devices. However, an IoT device may be a smart phone, laptop, tablet, PC, and/or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home devices, such as water distribution systems, electric power distribution systems, pipeline control systems, plant control systems, light switches, thermostats, locks, cameras, alarms, motion sensors, and the like. The IoT devices may be accessible through a controller, such as computers, servers, and other systems, for example, to control systems or access data. The controller and the IoT devices can be remotely located from one another.

The Internet can be configured to provide communications to a large number of IoT devices. Accordingly, as described herein, a number of innovations for the future Internet are designed to address the need for network layers, from central servers, through gateways, down to edge devices, to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity including a combination of wired and wireless technologies as depicted in FIGS. 1 and 2.

Figure 2:
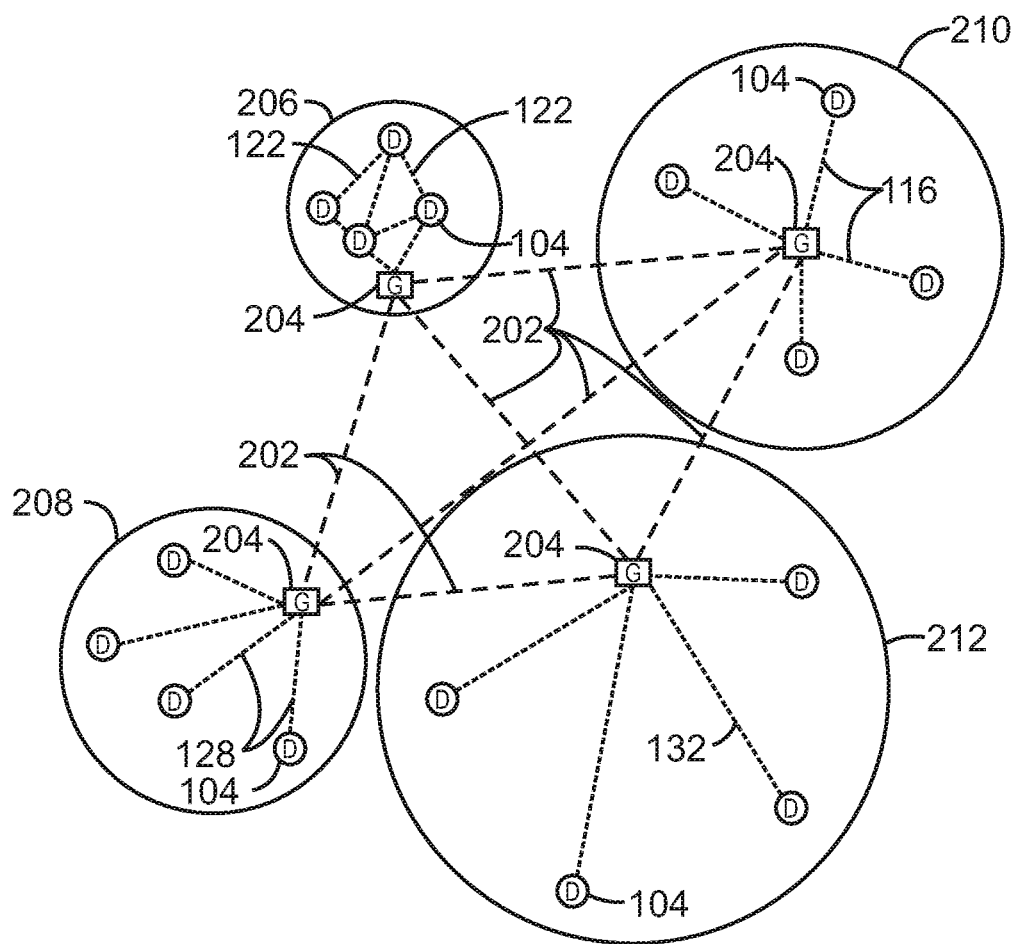
FIG. 2 illustrates a network topology for a number of internet-of-things (IoT) networks coupled through backbone links to gateways in accordance with some embodiments.

FIG. 1 is a drawing of interconnections that may be present between the Internet 100 and IoT networks in accordance with some embodiments. The interconnections may couple smaller networks 102, down to the individual IoT device 104, to the backbone 106 of the Internet 100. To simplify the drawing, not every device 104, or other object, is labeled.

In FIG. 1, top-level providers, which may be termed tier 1 ("T1") providers 108, are coupled by the backbone 106 of the Internet to other providers, such as secondary or tier 2 ("T2") providers 110. In some aspects, the backbone 106 can include optical fiber links. In one example, a T2 provider 110 may couple to a tower 112 of an LTE cellular network, for example, by further links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116.

In another example, a high-speed uplink 119 may couple a T2 provider 110 to a gateway 120. A number of IoT devices 104 may communicate with the gateway 120, and with each other through the gateway 120, for example, over Bluetooth low energy (BLE) links 122.

The backbone 106 may couple lower levels of service providers to the Internet, such as tier 3 ("T3") providers 124. A T3 provider 124 may be considered a general Internet service provider (ISP), for example, purchasing access to the backbone 106 from a T2 provider 110 and providing access to a corporate gateway 126 and other customers.

From the corporate gateway 126, a wireless local area network (WLAN) can be used to communicate with IoT devices 104 through Wi-Fi® links 128. A Wi-Fi link 128 may also be used to couple to a low power wide area (LPWA) gateway 130, which can communicate with IoT devices 104 over LPWA links 132, for example, compatible with the LoRaWAN specification promulgated by the LoRa Alliance.

The T3 provider 124 may also provide access to a mesh network 134 through a coordinator device 136 that communicates with the T3 provider 124 using any number of communications links, such as an LTE cellular link, an LPWA link, or a link 138 based on the IEEE 802.15.4 standard, such as Zigbee®. Other coordinator devices 136 may provide a chain of links that forms one or more cluster tree of linked devices.

In some aspects, one or more IoT devices 104 include the appropriate transceiver for the communications with other devices. Further, one or more IoT devices 104 may include other radio, optical, or acoustic transceivers, as well as wired network interfaces, for communications using additional protocols and frequencies. In some aspects, one or more IoT devices 104 includes components described in regard to FIG. 11.

The technologies and networks may enable the growth of devices and networks. As the technologies grow, the network may be developed for self-management, functional evolution, and/or collaboration, without needing direct human intervention. Thus, the technologies may enable networks to function without centralized controlled systems. The technologies described herein may automate the network management and operation functions beyond current capabilities. Further, the approaches may provide the flexibility to have a centralized control operating without human intervention, a centralized control that is automated, or any combinations thereof.

FIG. 2 is a drawing of a network topology 200 that may be used for a number of internet-of-things (IoT) networks coupled through backbone links 202 to gateways 204 in accordance with some embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet.

Although the topologies in FIG. 2 are hub-and-spoke and the topologies in FIG. 1 are peer-to-peer, it may be observed that these are not in conflict, but that peer-to-peer nodes may behave as hub-and-spoke through gateways. It may also be observed in FIG. 2 that a sub-net topology may have multiple gateways, rendering it a hybrid topology rather than a purely hub-and-spoke topology (or rather than a strictly hub-and-spoke topology).

The network topology 200 may include any number of types of IoT networks, such as a mesh network 206 using Bluetooth Low Energy (BLE) links 122. Other IoT networks that may be present include a WLAN network 208, a cellular network 210, and an LPWA network 212. Each of these IoT networks may provide opportunities for new developments, as described herein.

For example, communications between IoT devices 104, such as over the backbone links 202, may be protected by a decentralized system for authentication, authorization, and accounting (AAA). In a decentralized AAA system, distributed payment, credit, audit, authorization, brokering, arbitration, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, and vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner. This may allow such functionality as a first stage performing a first numerical operation, before passing the result to another stage, the next stage then performing another numerical operation, and passing that result on to another stage. The system may provide the ability to differentiate between assets and resources and the associated management of each. Furthermore, the proper components of infrastructure and resource based trust and service indices may be inserted to improve the data integrity, quality assurance, and deliver a metric of data confidence.

As described herein, the WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
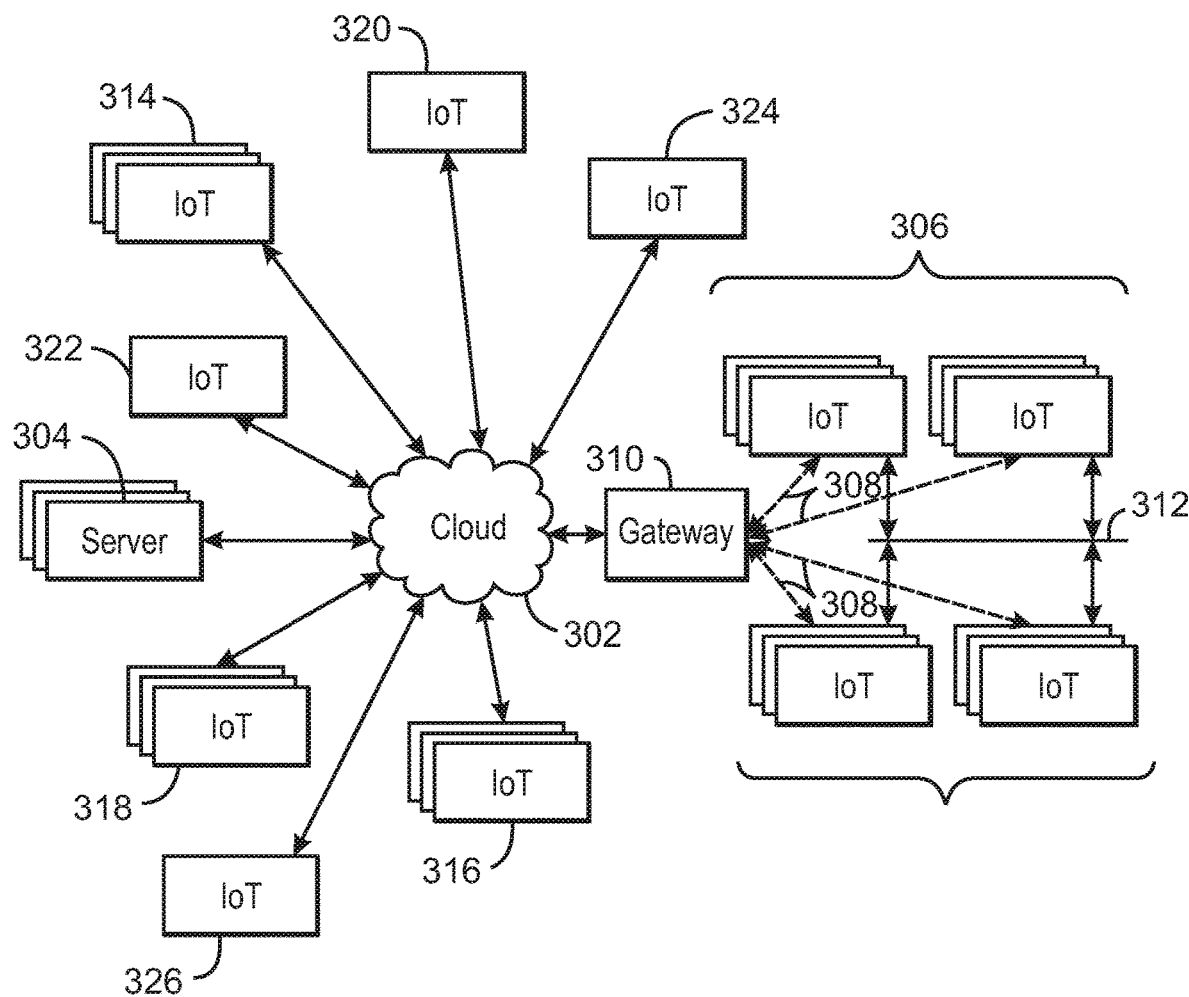
FIG. 3 illustrates a cloud computing network, or cloud, in communication with a number of IoT devices in accordance with some embodiments.

FIG. 3 is a drawing 300 of a cloud computing network, or cloud 302, in communication with a number of Internet of Things (IoT) devices in accordance with some embodiments. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 to communicate with the cloud 302.

Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. The fog device is discussed further with respect to FIG. 4.

Figure 4:
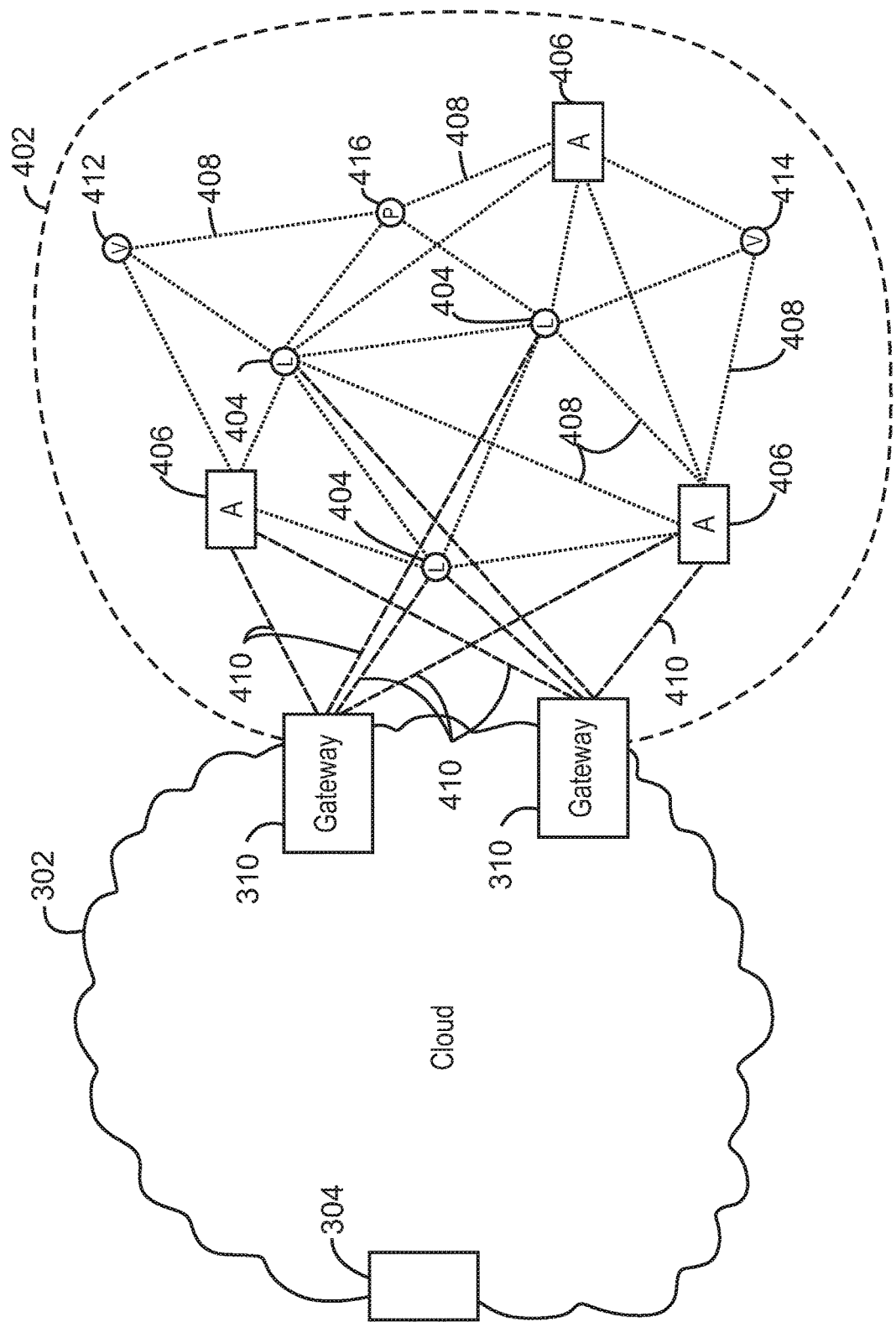
FIG. 4 illustrates a cloud computing network, or cloud, in communication with a mesh network of IoT devices, which may be termed a fog device, operating at the edge of the cloud in accordance with some embodiments.

FIG. 4 is a drawing 400 of a cloud computing network, or cloud 302, in communication with a mesh network of IoT devices, which may be termed a fog device 402, operating at the edge of the cloud 302 in accordance with some embodiments. Like numbered items are as described with respect to FIG. 3. As used herein, a fog device 402 is a cluster of devices that may be grouped to perform a specific function, such as traffic control, weather control, plant control, and the like.

In this example, the fog device 402 includes a group of IoT devices at a traffic intersection. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as traffic lights 404 and data aggregators 406 in this example. The fog device 402 can leverage the combined processing and network resources that the collective of IoT devices provides. Accordingly, a fog device 402 may be used for any number of applications including, for example, financial modeling, weather forecasting, seismic measurement, traffic analyses, security monitoring, and the like.

For example, traffic flow through the intersection may be controlled by a plurality of traffic lights 404 (e.g., three traffic lights 404). Analysis of the traffic flow and control schemes may be implemented by aggregators 406 that are in communication with the traffic lights 404 and each other through a mesh network. Data may be uploaded to the cloud 302, and commands received from the cloud 302, through gateways 310 that are in communication with the traffic lights 404 and the aggregators 406 through the mesh network.

Any number of communications links may be used in the fog device 402. Shorter-range links 408, for example, compatible with IEEE 802.15.4 may provide local communications between IoT devices that are proximate to the intersection. Longer-range links 410, for example, compatible with LPWA standards, may provide communications between the IoT devices and the gateways 310. To simplify the diagram, not every communication link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIO) standard specification 1.0 released by the Open Connectivity Foundation™ (OCF) on Dec. 23, 2015. This standard allows devices to discover each other and establish communications for interconnects. Other interconnection and operability protocols may also be used, including, for example, the Open Platform Communications (OPC) Unified Architecture released in 2008 by the OPC Foundation, the AllJoyn protocol from the AllSeen alliance, the optimized link state routing (OLSR) Protocol, or the better approach to mobile ad-hoc networking (B.A.T.M.A.N.), among many others.

In some aspects, communications from one IoT device may be passed along the most convenient path to reach the gateways 310, for example, the path having the fewest number of intermediate hops, or the highest bandwidth, among others. In these networks, the number of interconnections provide substantial redundancy, allowing communications to be maintained, even with the loss of a number of IoT devices.

In some aspects, the fog device 402 can include temporary IoT devices. In other words, not all of the IoT devices may be permanent members of the fog device 402. For example, in the exemplary system 400, three transient IoT devices have joined the fog device 402, a first vehicle 412, a second vehicle 414, and a pedestrian 416. In these cases, the IoT device may be built into the vehicles 412 and 414, or may be an app on a smart phone carried by the pedestrian 416.

Other IoT devices may also be present, such as IoT devices in bicycle computers, motorcycle computers, drones, and the like.

The fog device 402 formed from the IoT devices may be presented to clients in the cloud 302, such as the server 304, as a single device located at the edge of the cloud 302. In this example, the control communications to specific resources in the fog device 402 may occur without identifying any specific IoT device within the fog device 402. Accordingly, if one IoT device within the fog device 402 fails, other IoT devices in the fog device 402 may be able to discover and control a resource, such as an actuator, or other device attached to an IoT device. For example, the traffic lights 404 may be wired so as to allow any one of the traffic lights 404 to control lights for the other traffic lights 404. The aggregators 406 may also provide redundancy in the control of the traffic lights 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the pedestrian 416, join the fog device 402.

As the pedestrian 416 is likely to travel more slowly than the vehicles 412 and 414, the fog device 402 may reconfigure itself to ensure that the pedestrian 416 has sufficient time to make it through the intersection. This may be performed by forming a temporary group of the vehicles 412 and 414 and the pedestrian 416 to control the traffic lights 404. If one or both of the vehicles 412 or 414 are autonomous, the temporary group may instruct the vehicles to slow down prior to the traffic lights 404. Further, if all of the vehicles at the intersection are autonomous, the need for traffic signals may be diminished since autonomous vehicles' collision avoidance systems may allow for highly inter-leaved traffic patterns that may be too complex for traffic lights to manage. However, traffic lights 404 may still be important for the pedestrian 416, cyclists, or non-autonomous vehicles.

As the transient devices 412, 414, and 416, leave the vicinity of the intersection of the fog device 402, the fog device 402 may reconfigure itself to eliminate those IoT devices from the network. As other transient IoT devices approach the intersection, the fog device 402 may reconfigure itself to include those devices.

The fog device 402 may include the traffic lights 404 for a number of intersections, such as along a street, along with all of the transient IoT devices along the street. The fog device 402 may then divide itself into functional units, such as the traffic lights 404 and other IoT devices proximate to a single intersection. This type of combination may enable the formation of larger IoT constructs, e.g., groups of IoT devices that perform a particular function, in the fog device 402.

For example, if an emergency vehicle joins the fog device 402, an emergency construct, or virtual device, may be created that includes all of the traffic lights 404 for the street, allowing control of the traffic flow patterns for the entire street. The emergency construct may instruct the traffic lights 404 along the street to stay red for opposing traffic and green for the emergency vehicle, expediting the passage of the emergency vehicle.

As illustrated by the fog device 402, the organic evolution of IoT networks is central to improving or maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Networks of devices may be provided in a multi-access edge computing (MEC) environment. Multi-access edge computing (MEC), also referred to as mobile edge computing, may offer application developers and content providers cloud-computing capabilities and an information technology service environment at the edge of a network. An MEC system may include an MEC orchestrator, and an MEC platform manager, which manage the provision of a service to a user equipment (UE) device, by a service provider, through one or more access points, or one or more MEC hosts.

The MEC environment may be part of a radio access network (RAN) that has been opened to third party providers, such as clearing houses for blockchain transactions. The RAN may provide a high bandwidth, low latency system that allows fog devices 402 to function more efficiently with applications and services in the cloud 302. Accordingly, MEC 302 may be seen as a cloud or fog server running at the edge of a mobile network and performing tasks that may not be achieved with traditional network infrastructure. Machine-to-Machine gateway and control functions, such as the IoT device examples described with respect to FIGS. 3 and 4, are one example. In an MEC network, processing power, such as servers, are moved closer to the edge of networks. For example, the aggregators 406 located within the fog device 402.

Figure 5:
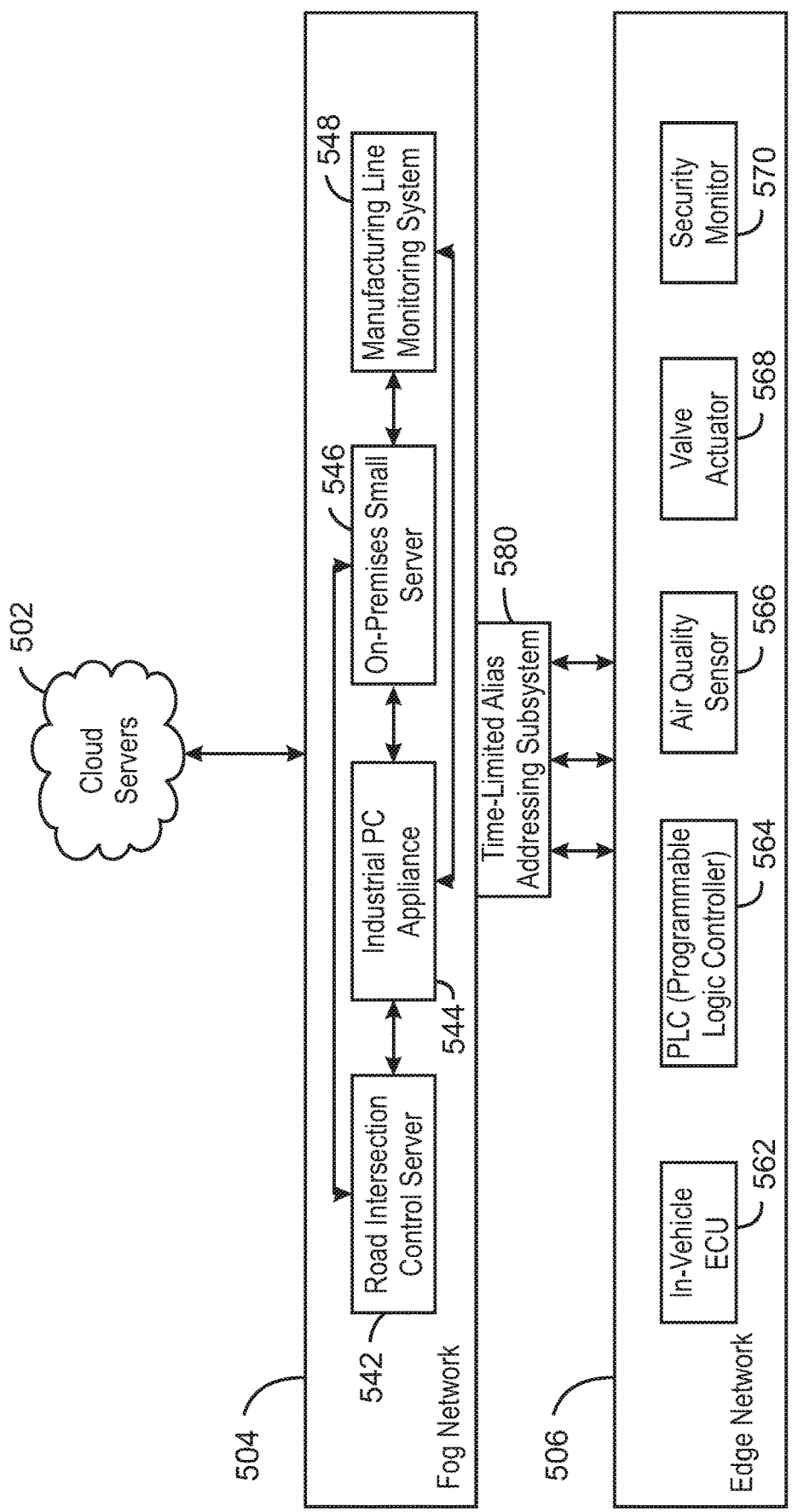
FIG. 5 illustrates an IoT system including a time-limited alias addressing subsystem in accordance with some embodiments.

FIG. 5 illustrates an IoT system 500 including a time-limited alias addressing subsystem 580 in accordance with some embodiments. In some embodiments, IoT system 500 includes one or more cloud servers 502 (for example, in some embodiments included in a cloud network), a fog network 504, and an edge network 506. In some embodiments, cloud servers 502 are coupled to fog network 504 via one or more optical, wired, or wireless networking. Examples of elements that can be included in fog network 504 are a road intersection control server 542, an industrial appliance 544 (for example, an industrial PC appliance), an on-premises small server 546, and a manufacturing line monitoring system 548. Examples of elements that can be included in edge network 506 include an in-vehicle electronic control unit (ECU) 562, a programmable logic controller (PLC) 564, an air quality sensor 566, a valve actuator 568, and a security monitor 570. In some embodiments, either or both of the fog network 504 and the time-limited alias addressing subsystem 580 are coupled to the edge network 506 via wireless networking. In some embodiments, either or both of the fog network 504 and the time-limited alias addressing subsystem 580 are coupled to the edge network 506 via wired networking. In some embodiments, any of the time-limited alias addressing techniques (or time-limited shortcode addressing techniques) described herein may be implemented by time-limited alias addressing subsystem 580.

In some embodiments, fog networks such as fog network 504 and edge networks such as edge network 506 can be highly dynamic infrastructures. Node churn can result in networks (for examples, networks included in system 500) with increased levels of connection handling and network management control traffic, which reduces available time and processing resources for the intended use of the network.

In some embodiments, time-limited alias addressing can be implemented (for example, using time-limited alias addressing subsystem 580) to reduce an average time for repetitive transactions in an IoT system (for example, such as system 500). These repetitive transactions can include, for example, device addressing, connection establishment, or address look-up transactions, among others. In some embodiments, a reusable alias approach (or short code approach, or nickname approach) can be implemented for edge and fog nodes. The reusable alias approach can be temporal in nature, where the short codes are not persistent and can be reused. Node identifiers (for example, IPv4, IPv6, or MAC addresses) can be mapped to a short code table of short code aliases.

In some embodiments, time-limited alias addressing can be used to aid in seamless interconnectivity between multiple disparate network types and protocols. In some embodiments, the time-limited alias addressing is a low overhead addressing approach suitable for constrained network environments (for example, where small packet size is critical to ensure low latency communications (for example, in mission-critical systems with fast control loop behaviors. In some embodiments, legacy upgrades can be supported by enabling legacy system address schemes to map addressing (for example, addressing such as IPv6 addressing) without having to perform significant upgrades that might cause long downtimes.

Some embodiments relate to accelerating fog/edge address translation and lookups in ultra-dense networks, including heterogeneous networks. This acceleration can be implemented, for example, using time-limited alias addressing (for example, using time-limited alias addressing subsystem 580). In heterogeneous network (hetnet) environments, end to end packet transfers may require multiple address translations as they cross network/protocol boundaries. An example of this can occur with an IEEE 802.11p originated packet with an IPv6 address that is destined for a low power networking endpoint (for example, IEEE 802.15.4g). According to some embodiments, a shortcode implementation (or time-limited alias-based address implementation) may be used that provides a time-limited reusable address space for fast address translations favoring the most active devices. Fast address translation favors, for example, fast control loop systems typical of mission-critical industrial/vehicular deployments (for example, robotics control and safety systems), among others.

Enabling real-time and high-value fog networks requires low connection establishment time, minimized packet overhead, and processing requirements. In some embodiments, Forwarding Database (FDB) table, Address Resolution Protocol (ARP) table, and routing table type functions are maintained on fog nodes. This can reduce overhead associated with repetitive transactions such as device addressing schemes, connection establishment, and address look-up transactions.

In fog and edge networks such as fog network 504 and edge network 506, packets from networked peers can flow from source(s) to destination peer(s). Peers in the fog and edge networks are not limited to a tree, star, or ring type topology. Many network nodes can be connected to each other in both a wired or wireless manner, and packets/frames can be sent from the source to the destination using a particular tree formation protocol such as, for example, Spanning Tree Protocol (STP), Rapid STP and Session Initiation Protocol (SIP) via layer-3 (routers) and layer-2 network devices (switches, hubs).

In some embodiments, a switch learns the source MAC address specified in the header of a data packet. The data packet may be received by creating an entry in a Forwarding Database (FDB) table, including the MAC address and the port number of the port via which the packet is received. Similarly, a router can learn the IP addresses associated with certain MAC addresses by performing an Address Resolution Protocol (ARP) broadcast, and then store the entries in an ARP look-up table. A routing table can be used to contain information (for example, destination IP, next hop, interface, routes, etc.) necessary to forward a packet along the best path toward its destination. A layer 3 switch typically performs both the routing and switching in a single device and will typically have an ARP, FDB, and routing table, and can perform both tasks depending on whether the packet/frame needs to be routed or switched.

As the number of network equipment increases in a fog network, the size of FDB, ARP, and routing tables in layer 3 and layer 2 network equipment also increases. With every packet of data, for example, a layer 2 device has to look twice in a FDB table for the source and destination addresses. If one million records are received per second, for example, the network needs to perform two million lookups in the FDB table. This results in sub-optimal average time required to search a MAC address, and negatively impacts real time performance of the device. Simply increasing the capacity increases the overall cost of the network.

In some embodiments, address translation may be optimized for heterogeneous fog networks (for example, multiple IP and non-IP networks). Some embodiments relate to time-limited alias addressing to support multiple IP and non-IP heterogeneous fog networks. Some embodiments provide for optimizing FDB, ARP, and routing table type look up functions on fog infrastructure, layer 3 devices such as routers, and layer 2 devices such as switches and hubs.

Figure 6:
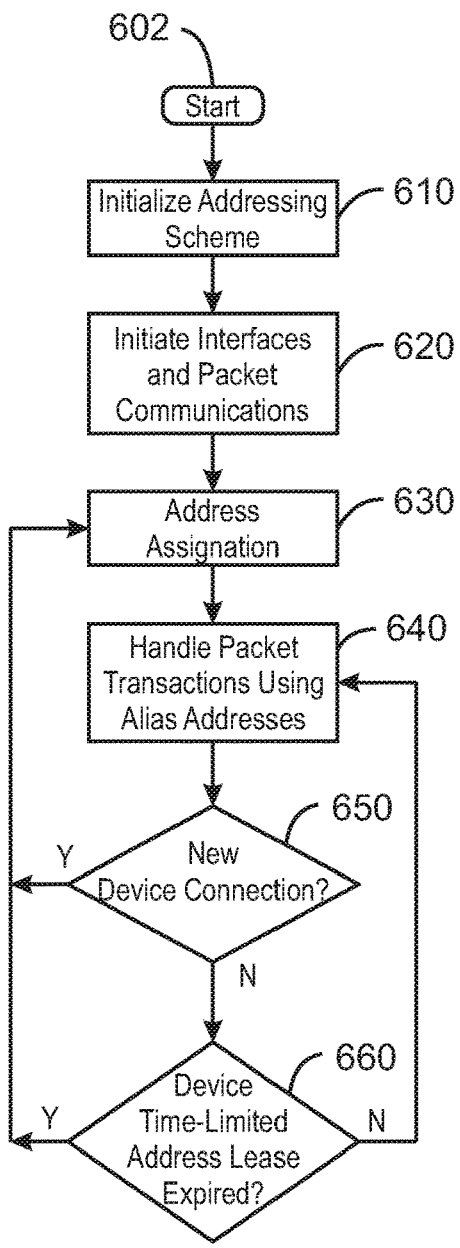
FIG. 6 illustrates alias-based time-limited addressing in accordance with some embodiments.

FIG. 6 illustrates alias-based time-limited addressing 600 in accordance with some embodiments. In some embodiments, alias-based time-limited addressing 600 is alias-based time-limited lease addressing (for example, for edge, foglets, and fog networks). In some embodiments, some or all features of alias-based time-limited addressing 600 is implemented by time-limited alias addressing subsystem 580. In some embodiments, addressing 600 includes a time-limited alias/shortcode approach with a mix of original addresses mapped to shortcodes. In some embodiments, the alias/shortcode can be assigned and ranked depending on behavior of the particular IoT device. In some embodiments, the shortest and fastest alias/shortcode is assigned to the most active device (for example, the device producing the highest number of connections and disconnections). In some embodiments, the shortest and fastest alias/shortcode is assigned to the highest priority device. In some embodiments, the approach can be inverted. That is, in some embodiments, edge/foglet devices producing the most churn can be de-ranked and essentially have their connect rates throttled. In some embodiments, devices producing the most rapid cycling between connections and disconnections due to infrastructure instability or other network volatility effects, resulting in large signaling overheads and management processing resource usage further up the stack can be de-ranked and have their connect rates throttled. In some embodiments, assignments between devices and shortcodes (or aliases) can be implemented in a different manner.

Alias-based time-limited addressing 600 starts at 602 and moves to box 610, where an addressing scheme is initialized. At initialization 610, a ranking table (for example, datastore) and alias address space can be created. The number of alias addresses created can be based on a maximum number of devices expected over a given time interval. In some embodiments, a small device space and rapid alias address reuse may be used (for example, release alias addresses after each packet). In some embodiments, a slower alias address reuse may be implemented.

Interfaces and packet communications are initialized at box 620. For example, in initiating communications and commencing packet handling at 620, packet state and device connection monitoring can be initiated at 620. Alias addresses can be assigned at box 630. In some embodiments, alias addresses are assigned and ranking links are commenced using performance metrics. In some embodiments, these performance metrics can include, for example, one or more of rate of connections and disconnections, packet delivery ratios, packet failures, checksum metrics, latency, connection cost, or priority of connection, among others. In some embodiments, the shortest and fastest alias/shortcode is assigned to the most active device (for example, producing the highest number of connections and disconnections). In some embodiments, the shortest and fastest alias/shortcode is assigned to a highest priority device. In some embodiments, the shortest and fastest alias/shortcode can be assigned based on other features.

At box 640 packet transactions are handled using assigned alias (shortcode) addresses. Upon new device connections or when the time leased alias addresses may expire, the ranking and alias address tables are updated. At box 650, if a new device connection is detected, flow returns to box 630 for new address assignation at 630 and packet transaction handling at 640. At box 650, if a new device connection is not detected, a decision is made at 660 to determine whether the time-limited address lease of the device has expired. If the time-limited address lease has expired at 660, flow returns to box 630 for new address assignation at 630 and packet transaction handling at 640. If the time-limited address lease has not expired at 660, flow returns to box 640 for packet transaction handling based on the current alias (shortcode) address assignments.

Figure 7:
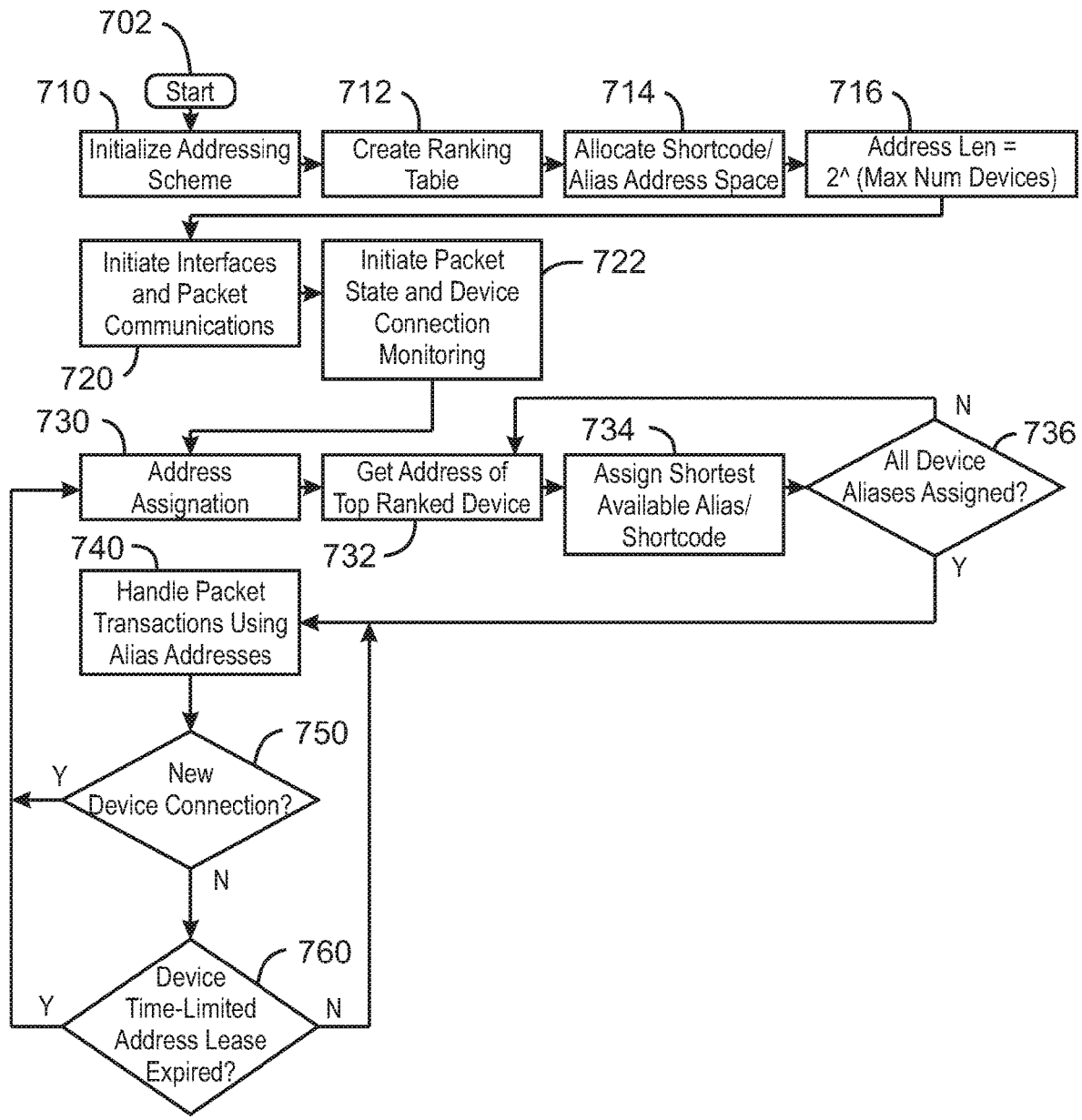
FIG. 7 illustrates alias-based time-limited addressing in accordance with some embodiments.

FIG. 7 illustrates alias-based time-limited addressing 700 in accordance with some embodiments. In some embodiments, alias-based time-limited addressing 700 is the same or similar to addressing 600 of FIG. 6. In some embodiments, alias-based time-limited addressing 700 is alias-based time-limited lease addressing (for example, for edge, foglets, and fog networks). In some embodiments, some or all features of alias-based time-limited addressing 700 is implemented by time-limited alias addressing subsystem 580. In some embodiments, addressing 700 includes a time-limited alias/shortcode approach with a mix of original addresses mapped to shortcodes. In some embodiments, the alias/shortcode can be assigned and ranked depending on behavior of the particular IoT device. In some embodiments, the shortest and fastest alias/shortcode is assigned to the most active device (for example, the device producing the highest number of connections and disconnections). In some embodiments, the shortest and fastest alias/shortcode is assigned to the highest priority device. In some embodiments, the approach can be inverted. That is, in some embodiments, edge/foglet devices producing the most churn can be de-ranked and essentially have their connect rates throttled. In some embodiments, devices producing the most rapid cycling between connections and disconnections due to infrastructure instability or other network volatility effects, resulting in large signaling overheads and management processing resource usage further up the stack can be de-ranked and have their connect rates throttled. In some embodiments, assignments between devices and shortcodes (or aliases) can be implemented in a different manner.

Alias-based time-limited addressing 700 starts at 702 and moves to box 710, where an addressing scheme is initialized. At initialization, a ranking table (for example, datastore) can be created at 712. In some embodiments, alias address space can also be created at 712. The number of alias addresses created can be based on a maximum number of devices expected over a given time interval. In some embodiments, a small device space and rapid alias address reuse may be used (for example, release alias addresses after each packet). In some embodiments, a slower alias address reuse may be implemented. The shortcode/alias address space is allocated at 714. At 716 the address length is set to a value, for example, at a value of $2^{\wedge(maximum\ number\ of\ devices)}$.

Interfaces and packet communications are then initialized at box 720. For example, in initiating communications and commencing packet handling at 720, packet state and device connection monitoring can be initiated at 722.

Alias addresses can then be assigned at box 730. In some embodiments, alias addresses are assigned and ranking links are commenced using performance metrics. In some embodiments, these performance metrics can include, for example, one or more of rate of connections and disconnections, packet delivery ratios, packet failures, checksum metrics, latency, connection cost, or priority of connection, among others. In some embodiments, the shortest and fastest alias/shortcode is assigned to the most active device (for example, producing the highest number of connections and disconnections). In some embodiments, the shortest and fastest alias/shortcode is assigned to a highest priority device. In some embodiments, the shortest and fastest alias/shortcode can be assigned based on other features. An address of the top ranked device is obtained at 732. Then the shortest available alias/shortcode is assigned at 734. If all devices have not yet been assigned at 736, the next top ranked device is obtained at 732 and the shortest available alias/shortcode is assigned at 734. This continues until a determination is made at 736 indicating that all device aliases/shortcodes have been assigned.

At box 740 packet transactions are then handled using assigned alias (shortcode) addresses. Upon new device connections or when the timeleased alias addresses may expire, the ranking and alias address tables are updated. At box 750, if a new device connection is detected, flow returns to box 730 for new address assignation at 730 and packet transaction handling at 740. At box 750, if a new device connection is not detected, a decision is made at 760 to determine whether the time-limited address lease of the device has expired. If the time-limited address lease has expired at 760, flow returns to box 730 for new address assignation at 730 and packet transaction handling at 740. If the time-limited address lease has not expired at 760, flow returns to box 740 for packet transaction handling based on the current alias (shortcode) address assignments.

FIG. 8 illustrates a mapping 800 of original addresses to alias addresses (or shortcodes) in accordance with some embodiments. Mapping 800 illustrates example rank, original address, and alias address (or shortcode) values. In some embodiments, mapping 800 may be used with addressing 600 or addressing 700. In some embodiments, mapping 800 illustrates a mix of original addresses mapped to shortcodes/ aliases, where the shortest and fastest alias/shortcode is assigned to the most active device (for example, producing the highest number of connections and disconnections). In some embodiments, other assignments may be made. In some embodiments, the mapping 800 can be used with IPv6 addressing. In some embodiments, mapping 800 can be used with other addressing, and embodiments are not limited to a particular addressing scheme.

Figure 9:
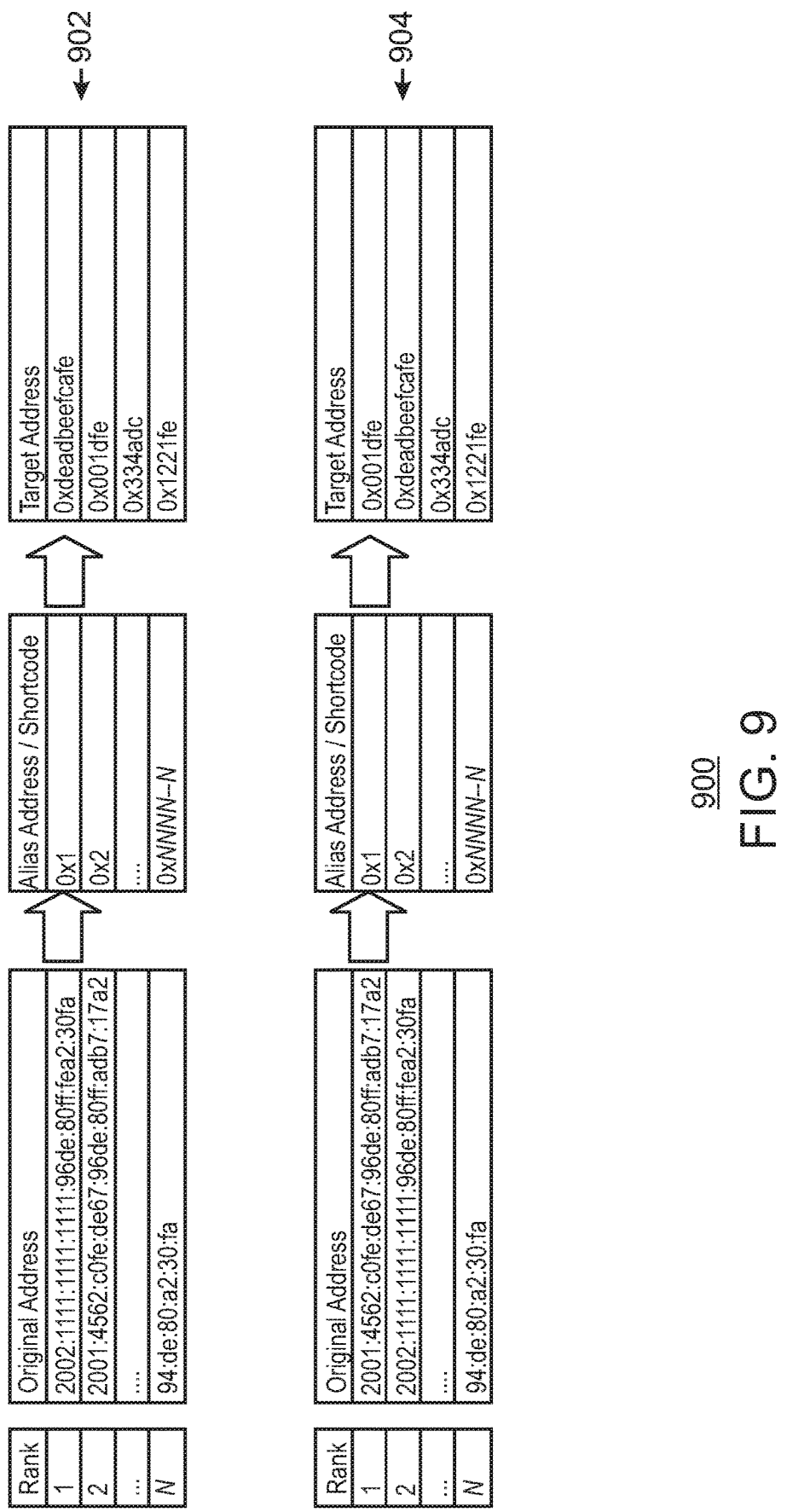
FIG. 9 illustrates alias-based address translation in accordance with some embodiments.

FIG. 9 illustrates alias-based address translation 900 in accordance with some embodiments. In some embodiments, address translation 900 includes a first mapping 902 and a second mapping 904. In the example illustrated by translation 900, in some embodiments, alias (or shortcode, or alias address/shortcode) 0x1 maps to an original address (for example, an IPv6 address) and also maps to a target device-specific address (target address) that is, for example, a hexadecimal address. In some embodiments, the alias based translation 900 of FIG. 9 is an example alias-based translation between an IPv6 address scheme and a scheme specific to one or more target devices (or target systems). In some embodiments, translation 900 enables a custom target scheme to map to an IPv6 address scheme (for example, without issues such as those associated with implementing full IPv6 address space, or 6LoWPAN/robust header compression, among others).

In some embodiments, mapping 902 and mapping 904 illustrate a situation following, for example, one or more of a rank update or an alias address time lease expiration, where the first and second alias shortcodes are swapped. As illustrated in FIG. 9, the original address and the target address in the rank 1 row illustrated in mapping 902 is switched with the original address and the target address in the rank 2 row illustrated in mapping 902 so that a new mapping 904 is created.

FIG. 9 illustrates an example of mapping 902 and 904 that can be used with addressing 600 or addressing 700 in some embodiments. FIG. 9 illustrates how alias-based address translation can be used between, for example, an IPv6 scheme and a scheme specific to a target system. This can enable a custom target scheme to map to an IPv6 address scheme without requiring implementation of full IPv6 address space or 6LoWPAN/robust header compression (RoHC), for example. In translation 900 illustrated in FIG. 9, the alias address can be reused. Specifically, FIG. 9 illustrates an example of how the ranking process can determine that two previous top two ranks can be swapped (for example, due to link performance, packet delivery rates, latency, reliability, etc., among others). However, other ranking process changes can be implemented other than swapping two top ranks in some embodiments.

Figure 10A:
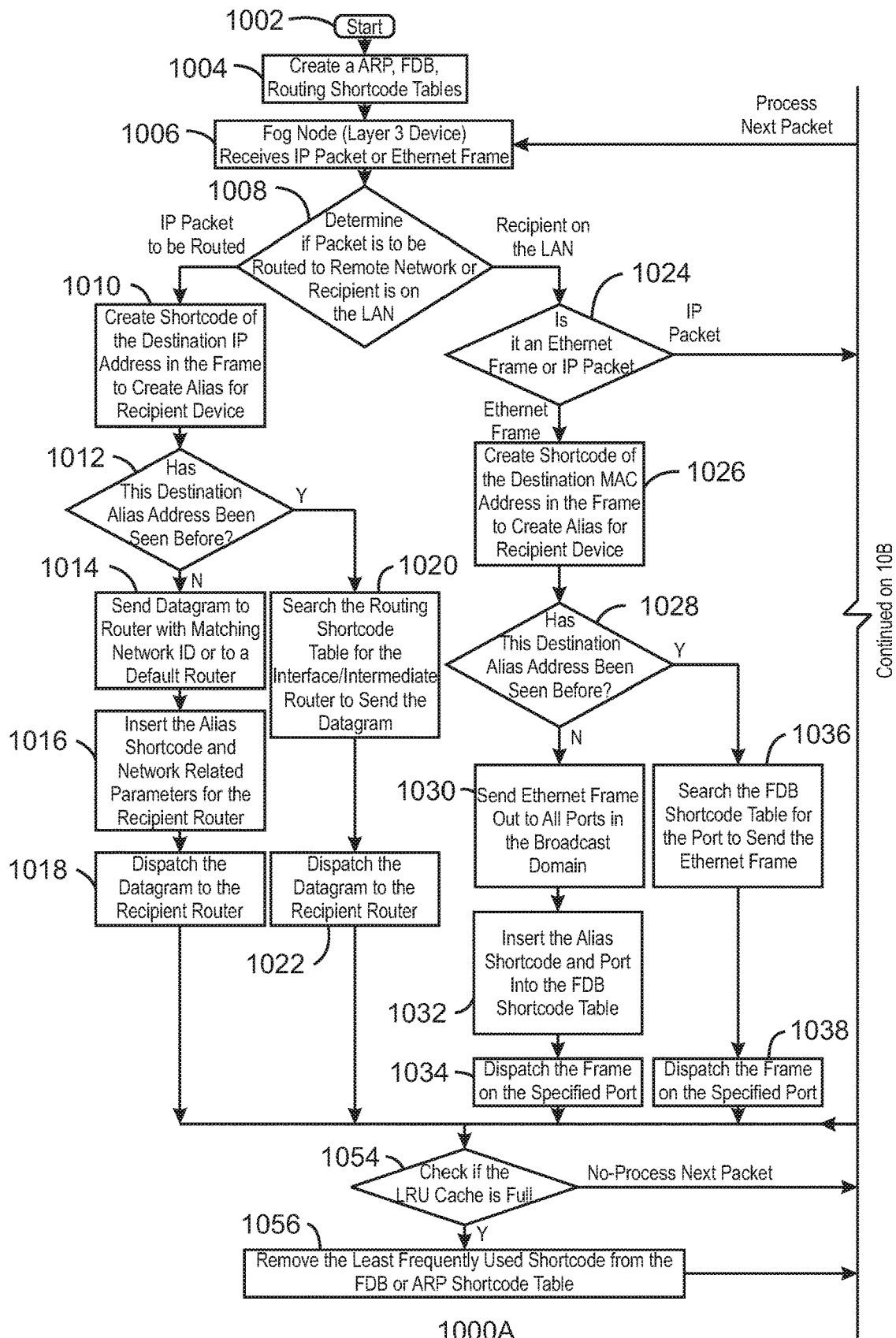
FIG. 10A and FIG. 10B, illustrates alias-based time-limited addressing in accordance with some embodiments.
Figure 10B:
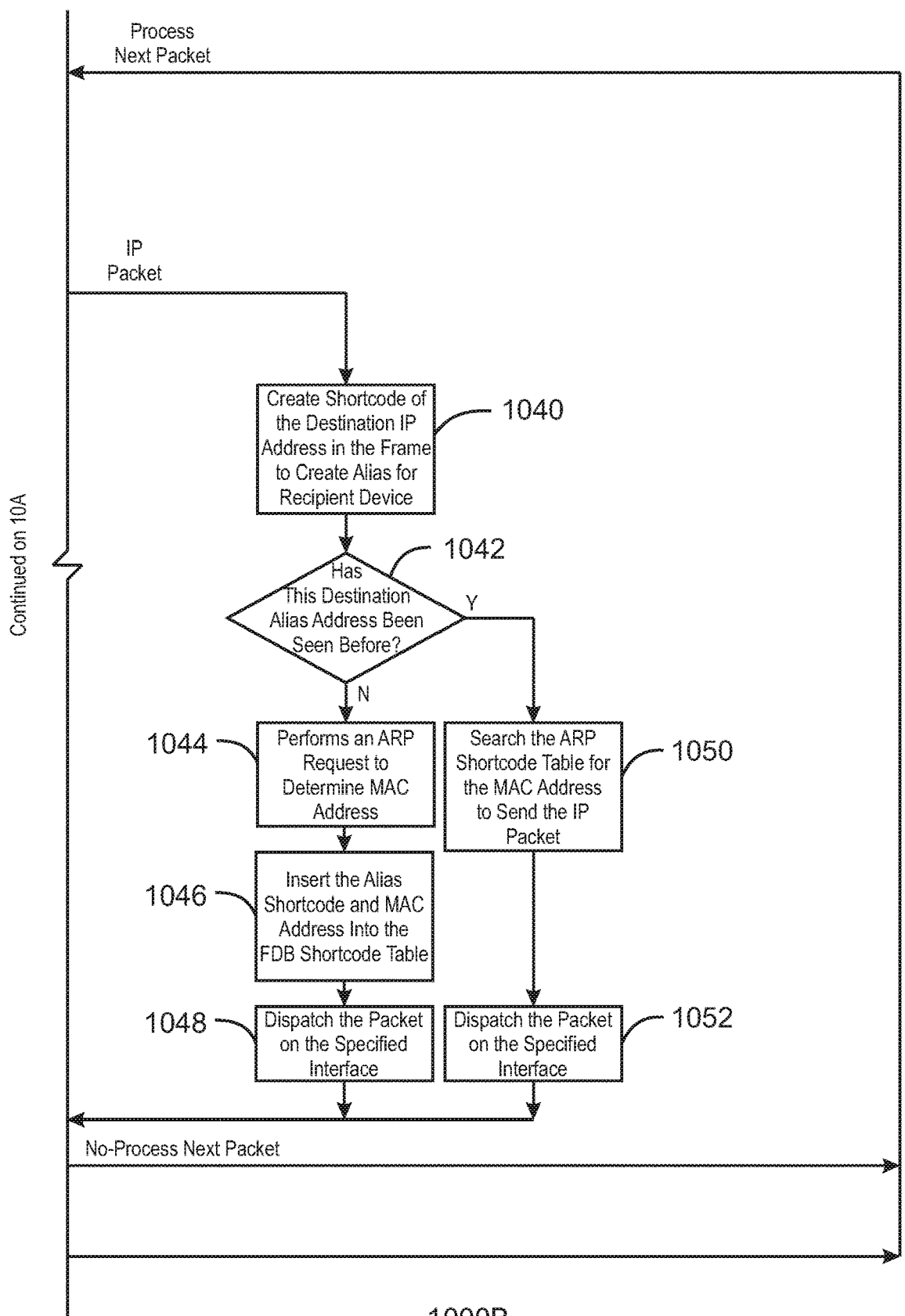

FIG. 10, which includes FIG. 10A and FIG. 10B, illustrates alias-based time-limited addressing 1000 in accordance with some embodiments. In some embodiments, alias-based time-limited addressing 1000 is alias-based time-limited lease addressing (for example, for edge, foglets, and fog networks). In some embodiments, some or all features of alias-based time-limited addressing 1000 is implemented by time-limited alias addressing subsystem 580. In some embodiments, addressing 1000 includes a time-limited alias/shortcode approach with a mix of original addresses mapped to shortcodes. In some embodiments, some or all elements of addressing 1000 can be implemented in other addressing, mapping, translation, etc. implementations described herein.

In some embodiments, addressing 1000 illustrates an alternative approach to targeting an IP network. In some embodiments, addressing 1000 uses an address aliasing table and ranking implementation to assign and refresh device identifiers (for example, IoT device identifiers) as they enter, use, or leave the system, for example. In some embodiments, if a least recently used (LRU) cache is full (for example, all alias addresses have been used), addressing 1000 can remove the least recently used shortcode/alias from the table, and assign it to a new device. Any implementations described in reference to FIG. 10 can be implemented in other implementations illustrated or described herein. For example, use of a LRU cache, and removing one or more least recently used shortcodes/aliases to make room for new devices/systems, etc. can be implemented in any of the addressing, mapping, translation, etc. implementations described herein.

Addressing 1000 begins at start 1002. At box 1004, ARP, FDB, and routing shortcode/alias tables can be created. Then, a fog node (for example, a layer 3 device) receives an IP packet or an Ethernet frame at 1006. At 1008, a determination is made as to whether a packet is to be routed to a remote network, or the recipient is on the LAN (local area network). If the IP packet is to be routed at 1008, a shortcode/alias address is created at 1010. For example, at 1010 a shortcode/alias address is created of the destination IP address in the frame to create an alias for the recipient device. At 1012, a determination is made as to whether or not the destination alias address has been seen before. If the destination alias address has not been seen before at 1012, a datagram is sent at 1014 to a router with a matching network ID (or to a default router). Then at 1016 the alias shortcode and network related parameters for the recipient router are inserted. The datagram is dispatched to the recipient router at box 1018. If the destination alias address has been seen before at 1012, the routing search code table is searched at 1020 for the interface/intermediate router to send the datagram, and the datagram is dispatched to the recipient router at 1022.

If the recipient is on the LAN at 1008, a decision is made at 1024 to determine whether it is an Ethernet frame or an IP packet. If it is an Ethernet frame at 1024, a shortcode/alias of the destination MAC address in the frame is created at 1026 to create an alias for the recipient device. Then a determination is made at 1028 as to whether the destination alias address has been seen before. If the alias destination address has not been seen before at 1028, the Ethernet frame is sent out to all ports in the broadcast domain at 1030. The alias shortcode and port are inserted into the FDB shortcode table at 1032. The frame is then dispatched on the specified port at 1034. If the alias destination address has been seen before at 1028, the FDB shortcode table for the port is searched at 1036 to send the Ethernet frame. The frame is then dispatched on the specified port at 1038.

If it is an IP packet at 1024, a shortcode of the destination IP address is created in the frame at 1040 to create an alias for the recipient device. At 1042, a determination is made as to whether the destination alias address has been seen before. If the destination alias address has not been seen before at 1042, an ARP request is performed at 1044 to determine the MAC address. The alias shortcode and MAC address are inserted into the FDB shortcode table at 1046. The packet is then dispatched on the specified interface at 1048. If the destination alias address has been seen before at 1042, the ARP shortcode table is searched for the MAC address at 1050 to send the IP packet. The packet is then dispatched on the specified interface at 1052.

After implementation of any of box 1018, 1022, 1034, 1038, 1048, or 1052, a determination is made at 1054 to check a least recently used (LRU) cache (or in some embodiments, a least frequently used cache) to determine whether it is full. For example, a full LRU cache can indicate that all aliases/shortcodes have been used. If the LRU cache is full at 1054, the least recently used (or in some embodiments, the least frequently used) shortcode is removed from the FDB or ARP shortcode table at 1056, and the next packet is processed by returning flow to box 1006. If the LRU cache is not full at 1054, the next packet is processed by returning flow to box 1006.

Figure 11:
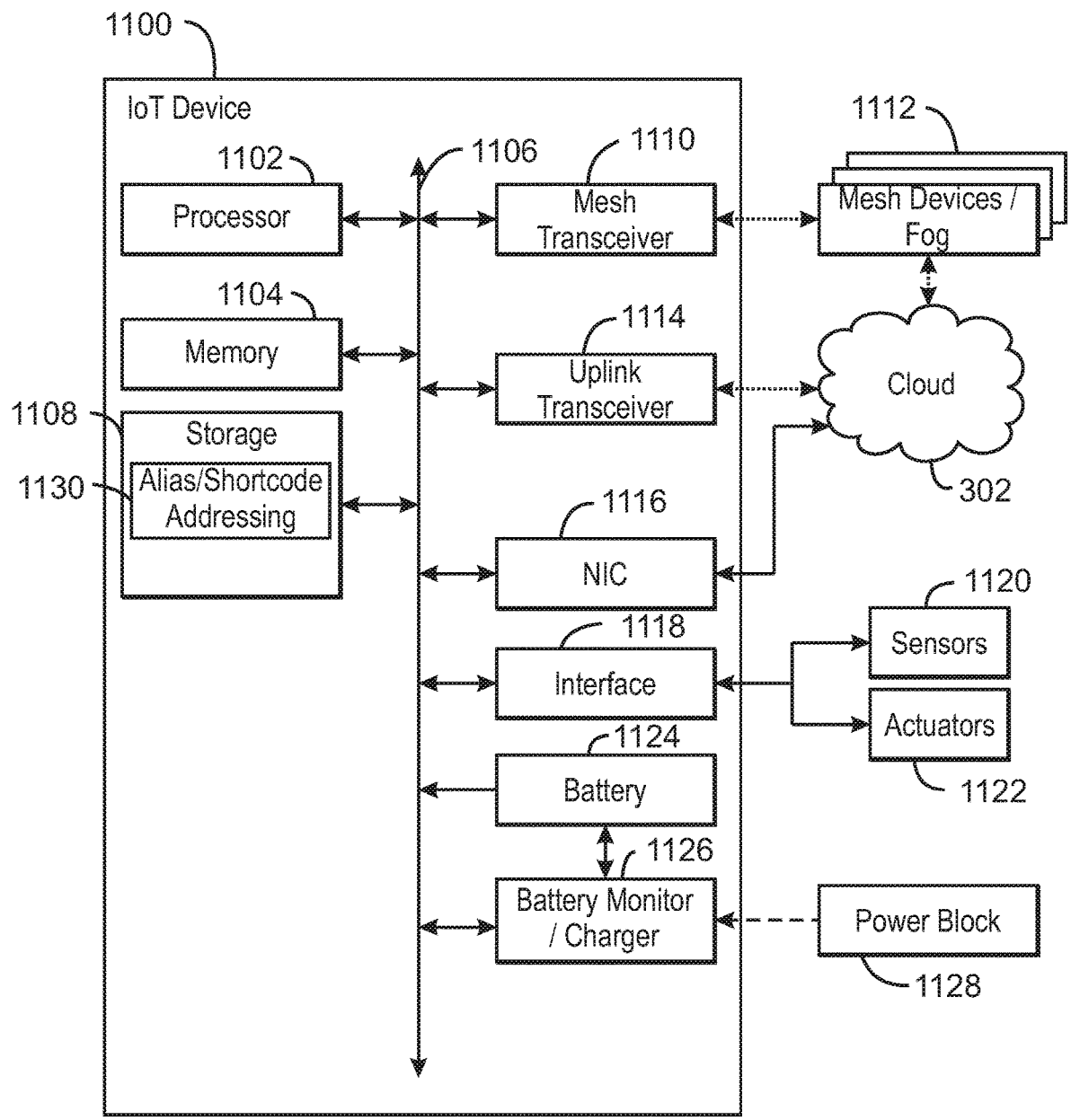
FIG. 11 is a block diagram of an example of components that may be present in an IoT device for implementing alias-based time-limited addressing in accordance with some embodiments.

FIG. 11 is a block diagram of an example of components that may be present in an IoT device 1100 for implementing alias-based time-limited addressing. In some embodiments, IoT device 1100 can implement any of the techniques illustrated or described herein. The IoT device 1100 may include any combinations of the components shown in the example. The components may be implemented as ICs, portions thereof, discrete electronic devices, or other modules, logic, hardware, software, firmware, or a combination thereof adapted in the IoT device 1100, or as components otherwise incorporated within a chassis of a larger system. The block diagram of FIG. 11 is intended to show a high level view of components of the IoT device 1100. However, some of the components shown may be omitted, additional components may be present, and different arrangement of the components shown may occur in other implementations.

The IoT device 1100 may include a processor 1102, which may be a microprocessor, a multi-core processor, a multi-threaded processor, an ultra-low voltage processor, an embedded processor, or other known processing element. The processor 1102 may be a part of a system on a chip (SoC) in which the processor 1102 and other components are formed into a single integrated circuit, or a single package, such as the Edison™ or Galileo™ SoC boards from Intel. As an example, the processor 1102 may include an Intel® Architecture Core™ based processor, such as a Quark™, an Atom™, an i3, an i5, an i7, a Xeon®, a Xeon Phi™ co-processor, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 1102 may communicate with a system memory 1104 over a bus 1106. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1108 may also be coupled to the processor 1102 via the bus 1106. To enable a thinner and lighter system design, the mass storage 1108 may be implemented via a solid state drive (SSD). Other devices that may be used for the mass storage 1108 include flash memory cards, such as SD cards, microSD cards, xD picture cards, and the like, and USB flash drives.

In low power implementations, the mass storage 1108 may be on-die memory or registers associated with the processor 1102. However, in some examples, the mass storage 1108 may be implemented using a micro hard disk drive (HDD). Further, any number of new technologies may be used for the mass storage 1108 in addition to, or instead of, the technologies described, such resistance change memories, phase change memories, holographic memories, or chemical memories, among others. For example, the IoT device 1100 may incorporate the 3D XPOINT memories from Intel® and Micron®.

The components may communicate over the bus 1106. The bus 1106 may include any number of technologies, including industry standard architecture (ISA), extended ISA (EISA), peripheral component interconnect (PCI), peripheral component interconnect extended (PCIx), PCI express (PCIe), or any number of other technologies. The bus 1106 may be a proprietary bus, for example, used in a SoC based system. Other bus systems may be included, such as an I²C interface, I³C interface, an SPI interface, point to point interfaces, and a power bus, among others.

The bus 1106 may couple the processor 1102 to a mesh transceiver 1110, for communications with other mesh devices 1112. The mesh transceiver 1110 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1112. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 1110 may communicate using multiple standards or radios for communications at different range. For example, the IoT device 1100 may communicate with geographically proximate devices, e.g., within about 10 meters, using a local transceiver based on BLE, or another low power radio, to save power. More distant mesh devices 1112, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 1110 may be incorporated into an MCU as an address directly accessible by the chip, such as in the Curie® units available from Intel.

An uplink transceiver 1114 may be included to communicate with devices in the cloud 302. The uplink transceiver 1114 may be LPWA transceiver that follows the IEEE 802.15.4, IEEE 802.15.4g, IEEE 802.15.4e, IEEE 802.15.4k, or NB-IoT standards, among others. The IoT device 1100 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, Weightless-P from the Weightless Special Interest Group, Random Phase Multiple Access (RPMA®) from Ingenu, and other technologies. Further, other communications techniques, such as time-slotted channel hopping, described in the IEEE 802.15.4e specification may be used.

Any number of other radio communications and protocols may be used in addition to the systems mentioned for the mesh transceiver 1110 and uplink transceiver 1114, as described herein. For example, the radio transceivers 1110 and 1112 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 1110 and 1112 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+ (High-speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 1114, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1116 may be included to provide a wired communication to the cloud 302 or to other devices, such as the mesh devices 1112. The wired communication may provide an Ethernet connection, or may be based on other types of networks, such as Controller Area Network (CAN), Local Interconnect Network (LIN), DeviceNet, ControlNet, Data Highway+, EtherCAT, SERCOS, PROFIBUS, PROFINET RT, or PROFINET IRT, among many others. An additional NIC 1116 may be included to allow connection to a second network, for example, a NIC 1116 providing communications to the cloud over Ethernet, and a second NIC 1116 providing communications to other devices over another type of network.

The bus 1106 may couple the processor 1102 to an interface 1118 that is used to connect external devices. The external devices may include sensors 1120, such as accelerometers, level sensors, flow sensors, temperature sensors, pressure sensors, barometric pressure sensors, and the like. The interface 1118 may be used to connect the IoT device 1100 to actuators 1122, such as power switches, valve actuators, an audible sound generator, a visual warning device, and the like.

While not shown, various input/output (I/O) devices may be present within, or connected to, the IoT device 1100. For example, a display may be included to show information, such as sensor readings or actuator position. An input device, such as a touch screen or keypad may be included to accept input.

A battery 1124 may power the IoT device 1100, although in examples in which the IoT device 1100 is mounted in a fixed location, it may have a power supply coupled to an electrical grid. The battery 1124 may be a lithium ion battery, a metal-air battery, such as a zinc-air battery, an aluminum-air battery, a lithium-air battery, a hybrid supercapacitor, and the like.

A battery monitor/charger 1126 may be included in the IoT device 1100 to track the state of charge (SoCh) of the battery 1120. The battery monitor/charger 1126 may be used to monitor other parameters of the battery 1124 to provide failure predictions, such as the state of health (SoH) and the state of function (SoF) of the battery 1124. The battery monitor/charger 1126 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1126 may communicate the information on the battery 1124 to the processor 1102 over the bus 1106. The battery monitor/charger 1126 may also include an analog-to-digital (ADC) convertor that allows the processor 1102 to directly monitor the voltage of the battery 1126 or the current flow from the battery 1124. The battery parameters may be used to determine actions that the IoT device 1100 may perform, such as transmission frequency, mesh network operation, sensing frequency, and the like.

A power block 1128, or other power supply coupled to a grid, may be coupled with the battery monitor/charger 1126 to charge the battery 1124. In some examples, the power block 1128 may be replaced with a wireless power receiver to obtain the power wirelessly, for example, through a loop antenna in the IoT device 1100. A wireless battery charging circuit, such as an LTC4020 chip from Linear Technologies of Milpitas, Calif., among others, may be included in the battery monitor/charger 1126. The specific charging circuits chosen depend on the size of the battery 1124, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 1128 may be augmented or replaced with solar panels, a wind generator, a water generator, or other natural power systems.

The mass storage 1108 may include a number of modules to implement one or more of IoT device addressing, alias/shortcode addressing, alias-based time-limited addressing, lease addressing, mapping, translation, or any other techniques described herein. Although shown as code blocks in the mass storage 1108, it may be understood that any of the modules may be fully or partially replaced with hardwired circuits, for example, built into an application specific integrated circuit (ASIC). The mass storage 1108 may include alias/shortcode addressing 1130 according to some embodiments. Addressing 1130 can include code to implement any of the techniques described herein. In some embodiments, IoT device 1100 can include a system or a subsystem to implement any of the techniques described herein. For example, in some embodiments, IoT device can be or can include a system or subsystem such as time-limited alias addressing subsystem 580 of FIG. 5.

Examples and embodiments of various techniques have been illustrated and described herein as being implemented, for example, using a processor executing stored instructions. However, it is noted that other examples and embodiments of any of these techniques can includes other implementations. For example, any of the techniques illustrated or described herein can be implemented in any of hardware, software, firmware, or in any combination thereof. Some embodiments can be implemented, for example, using an Application Specific Integrated Circuit (ASIC) or a Field Programmable Gate Array (FPGA), among others.

Figure 12:
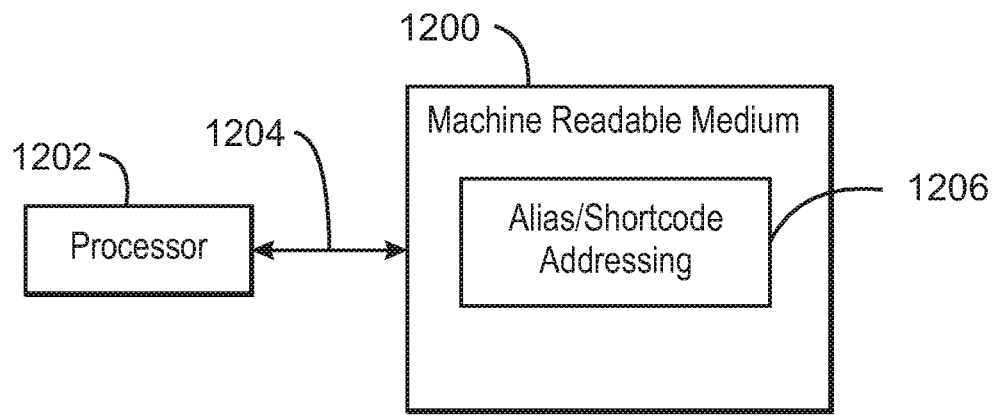
FIG. 12 is a block diagram of a non-transitory, machine readable medium including code to direct a processor to implement alias-based time-limited addressing in accordance with some embodiments.

FIG. 12 is a block diagram of an exemplary non-transitory, machine readable medium 1200 including code to direct a processor 1202 to implement alias-based time-limited addressing in accordance with some embodiments. The processor 1202 may access the non-transitory, machine readable medium 1200 over a bus 1204. The processor 1202 and bus 1204 may be selected as described with respect to the processor 1102 and bus 1106 of FIG. 11. The non-transitory, machine readable medium 1200 may include devices described for the mass storage 1108 of FIG. 11 or may include optical disks, thumb drives, or any number of other hardware devices.

The non-transitory, machine readable medium 1200 may include code 1206 to direct the processor 1202 to implement one or more of IoT device addressing, alias/shortcode addressing, alias-based time-limited addressing, lease addressing, mapping, translation, or any other techniques described herein.

The techniques described herein may be used to implement any number of IoT networks for various purposes. Additional applications may be implemented.

Example 1 includes an apparatus for addressing a plurality of Internet of Things (IoT) devices. The apparatus includes storage to store instructions and a processor to execute the stored instructions to initialize an IoT device alias addressing space, to assign an alias address to each of a plurality of the IoT devices, where the alias addresses are time-limited, and to handle packet transactions using the assigned alias addresses.

Example 2 includes the subject matter of example 1. In example 2, the processor is to execute the stored instructions to rank the alias addresses based on performance metrics of corresponding IoT devices, and to assign the alias addresses based on the rank of the alias addresses.

Example 3 includes the subject matter of any of examples 1-2. In example 3, the processor is to execute the stored instructions to rank the alias addresses based on behavior characteristics of corresponding IoT devices, and to assign the alias addresses based on the rank of the alias addresses.

Example 4 includes the subject matter of any of examples 1-3. In example 4, the processor is to execute the stored instructions to rank the alias addresses based on activity levels of corresponding IoT devices, and to assign the alias addresses based on the rank of the alias addresses.

Example 5 includes the subject matter of any of examples 1-4. In example 5, the processor is to execute the stored instructions to identify a new IoT device for which an alias address has not been assigned, to assign an alias address to the new IoT device, and to re-assign an alias address to each of the plurality of IoT devices.

Example 6 includes the subject matter of any of examples 1-5. In example 6, the processor is to execute the stored instructions to identify when a time limitation of one or more of the assigned alias addresses has expired, and to re-assign alias addresses in response to the identification that time limitation of one or more of the assigned alias addresses has expired.

Example 7 includes the subject matter of any of examples 1-6. In example 7, the processor is to execute the stored instructions to initialize the IoT device alias addressing space based on a maximum expected number of IoT devices over a given time interval.

Example 8 includes the subject matter of any of examples 1-7. In example 8, the processor is to execute the stored instructions to assign a length of the alias addresses based on a maximum number of IoT devices.

Example 9 includes a method of addressing a plurality of Internet of Things (IoT) devices, including initializing an IoT device alias addressing space, assigning an alias address to each of a plurality of the IoT devices, where the alias addresses are time-limited, and handling packet transactions using the assigned alias addresses.

Example 10 includes the subject matter of example 9. In example 10, the method includes ranking the alias addresses based on performance metrics of corresponding IoT devices, and assigning the alias addresses based on the ranking of the alias addresses.

Example 11 includes the subject matter of any of examples 9-10. In example 11, the method includes ranking the alias addresses based on behavior characteristics of corresponding IoT devices, and assigning the alias addresses based on the rank of the alias addresses.

Example 12 includes the subject matter of any of examples 9-11. In example 12, the method includes ranking the alias addresses based on activity levels of corresponding IoT devices, and assigning the alias addresses based on the rank of the alias addresses.

Example 13 includes the subject matter of any of examples 9-12. In example 13, the method includes identifying a new IoT device for which an alias address has not been assigned, assigning an alias address to the new IoT device, and re-assigning an alias address to each of the plurality of IoT devices.

Example 14 includes the subject matter of any of examples 9-13. In example 14, the method includes identifying when a time limitation of one or more of the assigned alias addresses has expires, and re-assigning alias addresses in response to the identifying that the time limitation of one or more of the assigned alias addresses has expired.

Example 15 includes the subject matter of any of examples 9-14. In example 15, the method includes initializing the IoT device alias addressing space based on a maximum expected number of IoT devices over a given time interval.

Example 16 includes the subject matter of any of examples 9-15. In example 16, the method includes assigning a length of the alias addresses based on a maximum number of IoT devices.

Example 17 includes a non-transitory computer readable medium including instructions that, when executed, direct a processor to initialize an IoT device alias addressing space, to assign an alias address to each of a plurality of the IoT devices, where the alias addresses are time-limited, and to handle packet transactions using the assigned alias addresses.

Example 18 includes the subject matter of example 17. In example 18, the non-transitory computer readable medium includes instructions that, when executed, direct a processor to rank the alias addresses based on performance metrics of corresponding IoT devices, and to assign the alias addresses based on the ranking of the alias addresses.

Example 19 includes the subject matter of any of examples 17-18. In example 19, the non-transitory computer readable medium includes instructions that, when executed, direct a processor to rank the alias addresses based on behavior characteristics of corresponding IoT devices, and to assign the alias addresses based on the rank of the alias addresses.

Example 20 includes the subject matter of any of examples 17-19. In example 20, the non-transitory computer readable medium includes instructions that, when executed, direct a processor to rank the alias addresses based on activity levels of corresponding IoT devices, and to assign the alias addresses based on the rank of the alias addresses.

Example 21 includes the subject matter of any of examples 17-20. In example 21, the non-transitory computer readable medium includes instructions that, when executed, direct a processor to identify a new IoT device for which an alias address has not been assigned, to assign an alias address to the new IoT device, and to re-assign an alias address to each of the plurality of IoT devices.

Example 22 includes the subject matter of any of examples 17-21. In example 22, the non-transitory computer readable medium includes instructions that, when executed, direct a processor to identify when a time limitation of one or more of the assigned alias addresses has expired, and to re-assign alias addresses in response to the identifying that the time limitation of one or more of the assigned alias addresses has expired.

Example 23 includes the subject matter of any of examples 17-22. In example 23, the non-transitory computer readable medium includes instructions that, when executed, direct a processor to initialize the IoT device alias addressing space based on a maximum expected number of IoT devices over a given time interval.

Example 24 includes the subject matter of any of examples 17-23. In example 24, the non-transitory computer readable medium includes instructions that, when executed, direct a processor to assign a length of the alias addresses based on a maximum number of IoT devices.

Example 25 includes an Internet of Things (IoT) network. The IoT network includes a fog network, an edge network, and an apparatus for addressing a plurality of IoT devices. The apparatus for addressing the plurality of IoT devices includes storage to store instructions and a processor to execute the stored instructions to initialize an IoT device alias addressing space, to assign an alias address to each of the plurality of IoT devices, where the alias addresses are time-limited, and to handle packet transactions using the assigned alias addresses.

Example 26 includes the subject matter of example 25. In example 26, the processor is to execute the stored instructions to rank the alias addresses based on performance metrics of corresponding IoT devices, and to assign the alias addresses based on the rank of the alias addresses.

Example 27 includes the subject matter of any of examples 25-26. In example 27, the processor is to execute the stored instructions to rank the alias addresses based on behavior characteristics of corresponding IoT devices, and to assign the alias addresses based on the rank of the alias addresses.

Example 28 includes the subject matter of any of examples 25-27. In example 28, the processor is to execute the stored instructions to rank the alias addresses based on activity levels of corresponding IoT devices, and to assign the alias addresses based on the rank of the alias addresses.

Example 29 includes the subject matter of any of examples 25-28. In example 29, the processor is to execute the stored instructions to identify a new IoT device for which an alias address has not been assigned, to assign an alias address to the new IoT device, and to re-assign an alias address to each of the plurality of IoT devices.

Example 30 includes the subject matter of any of examples 25-29. In example 30, the processor is to execute the stored instructions to identify when a time limitation of one or more of the assigned alias addresses has expired, and to re-assign alias addresses in response to the identification that time limitation of one or more of the assigned alias addresses has expired.

Example 31 includes the subject matter of any of examples 25-30. In example 31, the processor is to execute the stored instructions to initialize the IoT device alias addressing space based on a maximum expected number of IoT devices over a given time interval.

Example 32 includes the subject matter of any of examples 25-31. In example 32, the processor is to execute the stored instructions to assign a length of the alias addresses based on a maximum number of IoT devices.

Example 33 includes an apparatus for addressing a plurality of Internet of Things (IoT) devices, including an initializer to initialize an IoT device alias addressing space, and assignor to assign an alias address to each of a plurality of the IoT devices, where the alias addresses are time-limited, and a handler to handle packet transactions using the assigned alias addresses.

Example 34 includes the subject matter of example 33. In example 34, the apparatus includes a ranker to rank the alias addresses based on performance metrics of corresponding IoT devices, and an assignor to assign the alias addresses based on the rank of the alias addresses.

Example 35 includes the subject matter of any of examples 33-34. In example 35, the apparatus includes a ranker to rank the alias addresses based on behavior characteristics of corresponding IoT devices, and an assignor to assign the alias addresses based on the rank of the alias addresses.

Example 36 includes the subject matter of any of examples 33-35. In example 36, the apparatus includes a ranker to rank the alias addresses based on activity levels of corresponding IoT devices, and an assignor to assign the alias addresses based on the rank of the alias addresses.

Example 37 includes the subject matter of any of examples 33-36. In example 37, the apparatus includes an identifier to identify a new IoT device for which an alias address has not been assigned, an assignor to assign an alias address to the new IoT device, and an assignor to re-assign an alias address to each of the plurality of IoT devices.

Example 38 includes the subject matter of any of examples 33-37. In example 38, the apparatus includes an identifier to identify when a time limitation of one or more of the assigned alias addresses has expired, and a re-assignor to re-assign alias addresses in response to the identification that time limitation of one or more of the assigned alias addresses has expired.

Example 39 includes the subject matter of any of examples 33-38. In example 39, the apparatus includes an initializer to initialize the IoT device alias addressing space based on a maximum expected number of IoT devices over a given time interval.

Example 40 includes the subject matter of any of examples 33-39. In example 40, the apparatus includes an assignor to assign a length of the alias addresses based on a maximum number of IoT devices.

Example 41 includes an apparatus for addressing a plurality of Internet of Things (IoT) devices, including means for initializing an IoT device alias addressing space, means for assigning an alias address to each of a plurality of the IoT devices, where the alias addresses are time-limited, and means for handling packet transactions using the assigned alias addresses.

Example 42 includes the subject matter of example 41. In example 42, the apparatus includes means for ranking the alias addresses based on performance metrics of corresponding IoT devices, and means for assigning the alias addresses based on the ranking of the alias addresses.

Example 43 includes the subject matter of any of examples 41-42. In example 43, the apparatus includes means for ranking the alias addresses based on behavior characteristics of corresponding IoT devices, and means for assigning the alias addresses based on the rank of the alias addresses.

Example 44 includes the subject matter of any of examples 41-43. In example 44, the apparatus includes means for ranking the alias addresses based on activity levels of corresponding IoT devices, and means for assigning the alias addresses based on the rank of the alias addresses.

Example 45 includes the subject matter of any of examples 41-44. In example 45, the apparatus includes means for identifying a new IoT device for which an alias address has not been assigned, means for assigning an alias address to the new IoT device, and means for re-assigning an alias address to each of the plurality of IoT devices.

Example 46 includes the subject matter of any of examples 41-45. In example 46, the apparatus includes means for identifying when a time limitation of one or more of the assigned alias addresses has expired, and means for re-assigning alias addresses in response to the identifying that the time limitation of one or more of the assigned alias addresses has expired.

Example 47 includes the subject matter of any of examples 41-46. In example 47, the apparatus includes means for initializing the IoT device alias addressing space based on a maximum expected number of IoT devices over a given time interval.

Example 48 includes the subject matter of any of examples 41-47. In example 48, the apparatus includes means for assigning a length of the alias addresses based on a maximum number of IoT devices.

Example 49 includes an apparatus including means to perform a method as in any other example.

Example 50 includes machine-readable storage including machine-readable instructions, when executed, to implement a method or realize an apparatus as in any other example.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need to be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus for addressing a plurality of Internet of Things (IoT) devices, comprising:
   storage to store instructions; and
   a processor to execute the stored instructions to:
      initialize an IoT device alias addressing space;
      assign an alias address to each of a plurality of the IoT devices, where the alias addresses are time-limited, and where a length of the alias addresses is based on a maximum number of IoT devices; and
      handle packet transactions using the assigned alias addresses.

2. The apparatus of claim 1, wherein the processor is to execute the stored instructions to:
   rank the alias addresses based on performance metrics of corresponding IoT devices; and
   assign the alias addresses based on the rank of the alias addresses.

3. The apparatus of claim 1, wherein the processor is to execute the stored instructions to:
   rank the alias addresses based on behavior characteristics of corresponding IoT devices; and assign the alias addresses based on the rank of the alias addresses.

4. The apparatus of claim 1, wherein the processor is to execute the stored instructions to:
rank the alias addresses based on activity levels of corresponding IoT devices; and
assign the alias addresses based on the rank of the alias addresses.

5. The apparatus of claim 1, wherein the processor is to execute the stored instructions to:
identify a new IoT device for which an alias address has not been assigned;
assign an alias address to the new IoT device; and
re-assign an alias address to each of the plurality of IoT devices.

6. The apparatus of claim 1, wherein the processor is to execute the stored instructions to:
identify when a time limitation of one or more of the assigned alias addresses has expired; and
re-assign alias addresses in response to the identification that time limitation of one or more of the assigned alias addresses has expired.

7. The apparatus of claim 1, wherein the processor is to execute the stored instructions to:
initialize the IoT device alias addressing space based on a maximum expected number of IoT devices over a given time interval.

8. The apparatus of claim 1, wherein the processor is to execute the stored instructions to:
assign the length of the alias addresses based on the maximum number of IoT devices.

9. The apparatus of claim 1, wherein an alias address is assigned based on a performance of the IoT device.

10. The apparatus of claim 1, wherein an alias address is assigned based on a behavior of the IoT device.

11. The apparatus of claim 1, wherein an alias address is assigned based on an activity level of the IoT device.

12. The apparatus of claim 1, wherein an alias address is assigned based on a priority of the IoT device.

13. The apparatus of claim 1, wherein the processor is to execute the stored instructions to:
rank the alias addresses; and
assign the alias addresses based on the rank of the alias addresses.

14. The apparatus of claim 1, wherein the IoT device alias addressing space is a time-limited reusable address space that is leased until an expiration time.

15. A method of addressing a plurality of Internet of Things (IoT) devices, comprising:
initializing an IoT device alias addressing space;
assigning an alias address to each of a plurality of the IoT devices, where the alias addresses are time-limited, and where a length of the alias addresses is based on a maximum number of IoT devices; and
handling packet transactions using the assigned alias addresses.

16. The method of claim 15, comprising:
ranking the alias addresses based on performance metrics of corresponding IoT devices; and
assigning the alias addresses based on the ranking of the alias addresses.

17. The method of claim 15, comprising:
ranking the alias addresses based on behavior characteristics of corresponding IoT devices; and
assigning the alias addresses based on the rank of the alias addresses.

18. The method of claim 15, comprising:
ranking the alias addresses based on activity levels of corresponding IoT devices; and
assigning the alias addresses based on the rank of the alias addresses.

19. The method of claim 15, comprising:
identifying a new IoT device for which an alias address has not been assigned;
assigning an alias address to the new IoT device; and
re-assigning an alias address to each of the plurality of IoT devices.

20. The method of claim 15, comprising:
identifying when a time limitation of one or more of the assigned alias addresses has expired; and
re-assigning alias addresses in response to the identifying that the time limitation of one or more of the assigned alias addresses has expired.

21. The method of claim 15, comprising:
assigning the length of the alias addresses based on the maximum number of IoT devices.

22. A non-transitory computer readable medium comprising instructions that, when executed, direct a processor to:
initialize an IoT device alias addressing space;
assign an alias address to each of a plurality of the IoT devices, where the alias addresses are time-limited, and where a length of the alias addresses is based on a maximum number of IoT devices; and
handle packet transactions using the assigned alias addresses.

23. The non-transitory computer readable medium of claim 22, comprising instructions that, when executed, direct a processor to:
rank the alias addresses based on performance metrics of corresponding IoT devices; and
assign the alias addresses based on the ranking of the alias addresses.

24. The non-transitory computer readable medium of claim 22, comprising instructions that, when executed, direct a processor to:
rank the alias addresses based on behavior characteristics of corresponding IoT devices; and
assign the alias addresses based on the rank of the alias addresses.

25. The non-transitory computer readable medium of claim 22, comprising instructions that, when executed, direct a processor to:
rank the alias addresses based on activity levels of corresponding IoT devices; and
assign the alias addresses based on the rank of the alias addresses.

26. The non-transitory computer readable medium of claim 22, comprising instructions that, when executed, direct a processor to:
identify a new IoT device for which an alias address has not been assigned;
assign an alias address to the new IoT device; and
re-assign an alias address to each of the plurality of IoT devices.

27. The non-transitory computer readable medium of claim 22, comprising instructions that, when executed, direct a processor to:
identify when a time limitation of one or more of the assigned alias addresses has expired; and
re-assign alias addresses in response to the identifying that the time limitation of one or more of the assigned alias addresses has expired.

28. The non-transitory computer readable medium of claim 22, comprising instructions that, when executed, direct a processor to:
  initialize the IoT device alias addressing space based on a maximum expected number of IoT devices over a given time interval.

29. The non-transitory computer readable medium of claim 22, comprising instructions that, when executed, direct a processor to:
  assign the length of the alias addresses based on the maximum number of IoT devices.

30. An Internet of Things (IoT) network, comprising:
  a fog network;
  an edge network; and
  an apparatus for addressing a plurality of IoT devices, comprising:
    storage to store instructions; and
    a processor to execute the stored instructions to:
      initialize an IoT device alias addressing space;
      assign an alias address to each of the plurality of IoT devices, where the alias addresses are time-limited, and where a length of the alias addresses is based on a maximum number of IoT devices; and
      handle packet transactions using the assigned alias addresses.

31. The IoT network of claim 30, wherein the processor is to execute the stored instructions to:
  rank the alias addresses based on performance metrics of corresponding IoT devices; and
assign the alias addresses based on the rank of the alias addresses.

* * * * *